United States Patent
Yamaguchi et al.

(10) Patent No.: US 6,872,457 B2
(45) Date of Patent: Mar. 29, 2005

(54) ATOMIC OXYGEN-RESISTANT FILM

(75) Inventors: Hiroaki Yamaguchi, Tokyo (JP); Ryoichi Sato, Tokyo (JP); Shuichi Hashiguchi, Tokyo (JP); Masafumi Kohda, Toyko (JP)

(73) Assignee: Ube Industries, Ltd. (JP)

( * ) Notice: Subject to any disclaimer, the term of this patent is extended or adjusted under 35 U.S.C. 154(b) by 0 days.

(21) Appl. No.: 10/208,282

(22) Filed: Jul. 30, 2002

(65) Prior Publication Data

US 2003/0026998 A1 Feb. 6, 2003

(30) Foreign Application Priority Data

Jul. 31, 2001 (JP) ........................................ 2001-231745

(51) Int. Cl.$^7$ .............................................. B32B 25/20
(52) U.S. Cl. ................. 428/447; 428/473.5; 428/422.8; 428/413; 525/474; 525/476; 528/26; 524/588
(58) Field of Search ............................. 428/447, 473.5, 428/422.8, 413; 525/474, 476; 528/26; 524/588

(56) References Cited

U.S. PATENT DOCUMENTS

| | | | |
|---|---|---|---|
| 3,908,901 A | * | 9/1975 | Newcomb et al. |
| 5,252,703 A | | 10/1993 | Nakajima et al. |
| 5,643,986 A | | 7/1997 | Ishikawa et al. |

FOREIGN PATENT DOCUMENTS

| | | |
|---|---|---|
| JP | 4-036321 | 2/1992 |
| JP | 04238798 | 8/1992 |
| JP | 8-253677 | 10/1996 |
| JP | 9-118807 | 5/1997 |
| JP | 9-118808 | 5/1997 |

* cited by examiner

*Primary Examiner*—Kuo-Liang Peng
(74) *Attorney, Agent, or Firm*—DLA Piper Rudnick Gray Cary US LLP

(57) ABSTRACT

An atomic oxygen-resistant film comprising an atomic oxygen-resistant film formed on a polyimide film, wherein the mass reduction rate thereof is no greater than 1.0% when irradiated with atomic oxygen at an irradiation dose of approximately $3\times10^{20}$ atoms/cm$^2$ at a speed of about 8 km/sec.

9 Claims, No Drawings

ATOMIC OXYGEN-RESISTANT FILM

BACKGROUND OF THE INVENTION

1. Field of the Invention

The present invention relates to a polyimide-based atomic oxygen-resistant film.

2. Description of the Related Art

Numerous types of heat-resistant films are used as thermal control materials for artificial satellites, space shuttles, space stations and other purposes. Typical examples thereof are polyimide films and fluorine resin films.

Such heat-resistant films undergo gradual degradation in space under prolonged exposure to ions, electron beams, ultraviolet rays and atomic oxygen, eventually becoming unable to exhibit their original function as thermal control materials.

For example, polyimide films (such as KAPTON H by DuPont) are known to exhibit relatively high resistance to electron beams and ultraviolet rays, but to have low atomic oxygen resistance.

On the other hand, fluorine films are known to have high atomic oxygen resistance but low resistance to ions, electron beams and ultraviolet rays.

Several attempts have therefore been made to overcome these drawbacks. For example, it has been attempted to improve the atomic oxygen resistance of polyimide films.

However, the treatment steps in these methods are complex, and the improvement in atomic oxygen resistance has not been satisfactory.

BRIEF SUMMARY OF THE INVENTION

It is an object of the present invention to improve the atomic oxygen resistance of polyimide films used as thermal control materials for artificial satellites, space shuttles, space stations and for other space vehicle applications.

The invention relates to an atomic oxygen-resistant film comprising an atomic oxygen-resistant film (coated and cured film) formed on a polyimide film, wherein the mass reduction rate is no greater than 1.0% when irradiated with atomic oxygen at an irradiation dose of approximately $3 \times 10^{20}$ atoms/cm$^2$ at a speed of about 8 km/sec.

The invention further relates to an atomic oxygen-resistant film obtained by coating a polyimide film with an organic solvent solution containing a polyimidesiloxane, a thermosetting resin and a thermosetting resin-hardening agent, and heating to dryness to form a cured film.

The "atomic oxygen-resistant film" as used herein refers to a film obtained by coating and curing a varnish containing an atomic oxygen-resistant material.

DETAILED DESCRIPTION OF THE INVENTION

Preferred embodiments of the invention will now be provided.

1) The aforementioned atomic oxygen-resistant film, wherein the atomic oxygen-resistant film is a cured film comprising a polyimidesiloxane and a thermosetting resin.

2) The aforementioned atomic oxygen-resistant film, wherein the polyimidesiloxane is an organic polar solvent-soluble polyimidesiloxane obtained from a tetracarboxylic acid component and a diamine component comprising 10–90 mole percent of a diaminopolysiloxane represented by general formula (1):

$$H_2N-R-[Si(R_1)(R_2)-O-]_n-Si(R_3)(R_4)-R-NH_2 \quad (1)$$
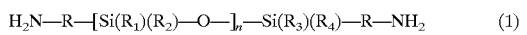

(wherein R represents a plurality of methylene groups of 2–6 carbons or a divalent hydrocarbon residue comprising a phenylene group; $R_1$, $R_2$, $R_3$ and $R_4$ each represent an alkyl group of 1–5 carbons or a phenyl group; and n represents an integer of 3–60) and 10–90 mole percent of an aromatic diamine (where the diaminopolysiloxane and aromatic diamine total 10 mole percent).

3) The aforementioned atomic oxygen-resistant film, wherein the polyimidesiloxane is obtained from a tetracarboxylic acid component and a diamine component comprising 10–90 mole percent of a diaminopolysiloxane, 1–20 mole percent of an aromatic diamine having a group such as COOH or OH which is reactive with a functional group such as epoxy or isocyanate, and 5–70 mole percent of a polycyclic aromatic diamine.

4) The aforementioned atomic oxygen-resistant film, wherein the thermosetting resin is at least one type of thermosetting resin selected from the group consisting of epoxy resins, bismaleimide-triazine based resins, bismaleimide resins and (iso)cyanate compound-based resins.

5) The aforementioned atomic oxygen-resistant film, wherein the proportion of each of the components is 1–100 parts by weight of the thermosetting resin to 100 parts by weight of the polyimidesiloxane.

6) The aforementioned atomic oxygen-resistant film, which further comprises an inorganic-or polymer-based ultraviolet absorber.

7) The aforementioned atomic oxygen-resistant film, wherein the thermosetting resin is compatible with the polyimidesiloxane.

There are no particular restrictions on the polyimide films which may be used for the invention, and for example, there may be mentioned films comprising pyromellitic dianhydride as the essential component (KAPTON H, KAPTON E, KAPTON EN, KAPTON V, etc. by Toray-DuPont Co., Ltd.; APIKAL product line by Kaneka Corp.) and films comprising 3,3',4,4'-biphenyltetracarboxylic dianhydride as the essential component (UPILEX-R, UPILEX-S by Ube Industries, Ltd.). The polyimide film preferably has a thickness of about 7.5–125 µm.

The polyimide film may be treated with a discharge treatment such as plasma discharge or corona discharge treatment or by a surface treatment such as alkali treatment, for improved adhesion, but this is not an essential condition for the invention.

Formation of the atomic oxygen-resistant film is essential according to the invention.

As preferred atomic oxygen-resistant films there may be mentioned cured films comprising polyimidesiloxanes and polyimidesiloxanes with thermosetting resins.

The cured film is preferably formed by coating a polyimide film with an organic solvent solution containing a polyimidesiloxane, a thermosetting resin and a thermosetting resin-hardening agent, and heating to dryness.

As polyimidesiloxanes there may be mentioned polyimidesiloxanes which are obtained from a tetracarboxylic acid component, especially a tetracarboxylic dianhydride, and a diamine component comprising 10–90 mole percent of a diaminopolysiloxane represented by general formula (1):

$$H_2N-R-[Si(R_1)(R_2)-O-]_n-Si(R_3)(R_4)-R-NH_2 \quad (1)$$
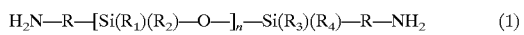

(wherein R represents a plurality of methylene groups of 2–6 carbons or a divalent hydrocarbon residue comprising a phenylene group; $R_1$, $R_2$, $R_3$ and $R_4$ each represent an alkyl group of 1–5 carbons or a phenyl group; and n represents an integer of 3–60) and 10–90 mole percent of an aromatic diamine (where the diaminopolysiloxane and aromatic diamine total 10 mole percent), and these also include imidosiloxane oligomers.

The reaction between the tetracarboxylic dianhydride and the diamine may be carried out in a medium by a random reaction, block reaction or two-solution mixture/rebonding reaction. The reaction may be accomplished by a method of polymerizing both monomer components at high temperature (most preferably at a temperature of 140° C. or higher) for imidization. The polyimidesiloxane may also be used directly without isolation from the solution.

As specific examples of such diaminopolysiloxane compounds there may be mentioned α,ω-bis(2-aminoethyl)polydimethylsiloxane, α,ω-bis(3-aminopropyl)polydimethylsiloxane, α,ω-bis(4-aminophenyl)polydimethylsiloxane, α,ω-bis(4-amino-3-methylphenyl)polydimethylsiloxane, α,ω-bis(3-aminopropyl)polydiphenylsiloxane and α,ω-bis(4-aminobutyl)polydimethylsiloxane.

As tetracarboxylic dianhydrides there may be mentioned aromatic tetracarboxylic dianhydrides such as 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, bis(3,4-dicarboxyphenyl)ether dianhydride, pyromellitic dianhydride, 2,3,6,7-naphthalenetetracarboxylic dianhydride, 1,2,5,6-naphthalenetetracarboxylic dianhydride, 1,2,4,5-naphthalenetetracarboxylic dianhydride, 1,4,5,8-naphthalenetetracarboxylic dianhydride, 2,2-bis(2,5-dicarboxyphenyl)propane dianhydride, 1,1-bis(2,3-dicarboxyphenyl)ethane dianhydride, 1,1-bis(3,4-dicarboxyphenyl)sulfone dianhydride and 1,3-bis(3,4-dicarboxyphenyl)-1,1,3,3-tetramethyldisiloxane dianhydride.

As tetracarboxylic dianhydrides there may also be mentioned alicyclic tetracarboxylic dianhydrides such as cyclopentanetetracarboxylic dianhydride, cyclohexanetetracarboxylic dianhydride and methylcyclohexenetetracarboxylic dianhydride.

One of the aforementioned tetracarboxylic dianhydrides may be used alone, or two or more thereof may be used in combination.

As tetracarboxylic dianhydrides with high solubility in a medium and high heat resistance of the resulting cured film there are particularly preferred aromatic tetracarboxylic dianhydrides such as 2,3,3',4'-biphenyltetracarboxylic dianhydride, 3,3',4,4'-benzophenonetetracarboxylic dianhydride, bis(3,4-dicarboxyphenyl)ether dianhydride and 1,3-bis(3,4-dicarboxyphenyl)-1,1,3,3-tetramethyldisiloxane dianhydride, with 2,3,3',4'-biphenyltetracarboxylic dianhydride being especially preferred.

As aromatic diamines with functional groups that are reactive with the aforementioned epoxy groups and the like there may be used aromatic diamine compounds represented by the following formula:

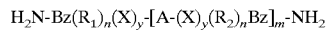

H$_2$N-Bz(R$_1$)$_n$(X)$_y$-[A-(X)$_y$(R$_2$)$_n$Bz]$_m$-NH$_2$ wherein Bz is a benzene ring, R$_1$ and R$_2$ are both hydrogen, A is a direct bond or a divalent group such as O, S, CO, SO$_2$, SO, CH$_2$, C(CH$_3$)$_2$, OBzO, Bz or OBzC(CH$_3$)$_2$BzO, X is carboxyl or hydroxyl, m is 0 or 1, n is 2 or 3 (preferably 3), y is 1 or 2 (preferably 1), and n+y=4.

Two types of the aforementioned diamines are preferably used for the diamine component, and even a multi-ring aromatic diamine with no epoxy-reactive groups may be used. As heterocyclic aromatic diamines there may be mentioned aromatic diamines with 3 benzene rings such as 1,4-bis(4-aminophenoxy)benzene, 1,3-bis(4-aminophenoxy)benzene and 1,4-bis(4-aminophenyl)benzene, or aromatic diamines with 4 benzene rings such as bis[4-(4-aminophenoxy)phenyl]sulfone and 2,2-bis[4-(4-aminophenoxy)phenyl]propane.

As specific examples of aromatic diamines with functional groups that are reactive with epoxy groups and the like there may be mentioned diaminophenol compounds such as 2,4-diaminophenol, hydroxybiphenyl compounds such as 3,3'-diamino-4,4'-dihydroxybiphenyl, 4,4'-diamino-3,3'-dihydroxybiphenyl, 4,4'-diamino-2,2'-dihydroxybiphenyl and 4,4'-diamino-2,2',5,5'-tetrahydroxybiphenyl, hydroxydiphenylalkane compounds such as 3,3'-diamino-4,4'-dihydroxydiphenylmethane, 4,4'-diamino-3,3'-dihydroxydiphenylmethane, 4,4'-diamino-2,2'-dihydroxydiphenyl methane, 2,2-bis[3-amino-4-hydroxyphenyl]propane, 2,2-bis[4-amino-3-hydroxyphenyl]propane, 2,2-bis[3-amino-4-hydroxyphenyl]hexafluoropropane and 4,4'-diamino-2,2',5,5'-tetrahydroxydiphenylmethane, hydroxydiphenyl ether compounds such as 3,3'-diamino-4,4'-dihydroxydiphenyl ether, 4,4'-diamino-3,3'-dihydroxydiphenyl ether, 4,4'-diamino-2,2'-dihydroxydiphenyl ether and 4,4'-diamino-2,2',5,5'-tetrahydroxydiphenyl ether, bis(hydroxyphenoxyphenyl)alkane compounds such as 2,2-bis[4-(4-amino-3-hydroxyphenoxy)phenyl]propane, and bis(hydroxyphenoxy)biphenyl compounds such as 4,4'-bis(4-amino-3-hydroxyphenoxy)biphenyl.

As specific examples of aromatic diamines with functional groups that are reactive with epoxy groups and the like there may also be mentioned carboxybiphenyldiamine compounds such as 3,3'-diamino-4,4'-dicarboxybiphenyl, 4,4'-diamino-3,3'-dicarboxybiphenyl, 4,4'-diamino-2,2'-dicarboxybiphenyl and 4,4'-diamino-2,2',5,5'-tetracarboxybiphenyl, carboxydiphenylalkane diamine compounds such as 3,3'-diamino-4,4'-dicarboxydiphenyl methane, 4,4'-diamino-3,3'-dicarboxydiphenylmethane, 4,4'-diamino-2,2'-dicarboxydiphenylmethane, 2,2-bis[3-amino-4-carboxyphenyl]propane, 2,2-bis[4-amino-3-carboxyphenyl]propane, 2,2-bis[3-amino-4-carboxyphenyl]hexafluoropropane and 4,4'-diamino-2,2',5,5'-tetracarboxybiphenyl, carboxydiphenylether diamine compounds such as 3,3'-diamino-4,4'-dicarboxydiphenyl ether, 4,4'-diamino-3,3'-dicarboxydiphenyl ether, 4,4'-diamino-2,2'-dicarboxydiphenyl ether and 4,4'-diamino-2,2',5,5'-tetracarboxydiphenyl ether, bis(carboxyphenoxyphenyl)alkane diamine compounds such as 2,2-bis[4-(4-amino-3-carboxyphenoxy)phenyl]propane, bis(carboxyphenoxy)biphenyldiamine compounds such as 4,4'-bis(4-amino-3-carboxyphenoxy)biphenyl, and diaminobenzoic acids such as 3,5-diaminobenzoic acid and 2,4-diaminobenzoic acid.

As the aforementioned reaction medium there may be mentioned nitrogen-containing solvents such as N,N-dimethylacetamide, N,N-diethylacetamide, N,N-dimethylformamide, N,N-diethylformamide, N-methyl-2-pyrrolidone, 1,3-dimethyl-2-imidazolidinone and N-methylcaprolactam, sulfur atom-containing solvents such as dimethylsulfoxide, diethylsulfoxide, dimethylsulfone, diethylsulfone and hexamethylsulforamide, oxygen-containing solvents such as γ-butyrolactone, phenolic solvents such as cresol, phenol and xylenol, diglyme-based solvents such as diethyleneglycol dimethylether (diglyme), triethyleneglycol dimethylether (dimethyltriglyme) and tetraglyme, as well as acetone, ethylene glycol, dioxane and tetrahydrofuran.

The polyimidesiloxane is a polymer with an inherent viscosity (measuring concentration: 0.5 g/100 milliliters of solvent; solvent: N-methyl-2-pyrrolidone; measuring temperature: 30° C.) of 0.05–7, especially 0.07–4 and more preferably about 0.1–3, and is preferably one which uniformly dissolves in organic polar solvents (especially amide-based solvents) to a concentration of at least 3 wt %, and especially about 5–40 wt %.

The polyimidesiloxane has an imidization rate of 90% or greater and especially 95% or greater as measured by infrared spectrometry, and it preferably has an imidization rate sufficiently high so that, in infrared spectrometry, substantially no absorption peak is observed for the amic acid bond of the polymer, but an absorption peak is only observed for the imide ring bond.

The polyimidesiloxane, when shaped into a film, has an elastic modulus of no greater than 250 kg/mm$^2$, especially about 0.1–200 kg/mm$^2$ and more preferably no greater than 0.5–150 kg/mm$^2$, a thermal decomposition initiating temperature of 250° C. or higher and especially 300° C. or higher, and a secondary transition temperature of −10° C. or higher and especially about 5–250° C.

A thermosetting resin is preferably used together with the polyimidesiloxane.

When the polyimidesiloxane is used alone to form a film, a film obtained by heating is sticky and exhibits poor workability as an atomic oxygen-resistant film in applications for space vehicles such as artificial satellites.

For purposes requiring transparency, such as solar cell protective films or camera lens protective films, the thermosetting resin is preferably a thermosetting resin that is compatible with the polyimidesiloxane. Inclusion of an inorganic filler is preferred, but an inorganic filler may be substantially absent for uses which require transparency.

Epoxy resins may be mentioned as suitable thermosetting resins, examples of which include epoxy resins which are "epoxy compounds having at least one epoxy group", such as o-cresol-novolac epoxy resins, phenol-novolac epoxy resins, bisphenol A epoxy resins, bisphenol F epoxy resins, glycidyl ether epoxy resins, glycidyl ester epoxy resins and glycidylamine epoxy resins, any of which epoxy resins may also be used in combinations of two or more.

As thermosetting resins there may be mentioned bismaleimide-triazine resins, and specifically there may be mentioned bismaleimide-triazine resins which are publicly known thermosetting resin compositions with an imide group and a triazine group, obtained from, for example, a bismaleimide component and a triazine monomer or prepolymer component with a cyanate group, optionally modified with 0–30 wt % of an acrylate, divinylbenzene, styrene, triallyl isocyanate or the like, and particularly "BT Resin" by Mitsubishi Gas Chemical Co., Inc.

As thermosetting resins there may also be mentioned bismaleimide resins having a maleic acid-based unsaturated (double-bond) group at both ends, which is obtained, for example, by condensation of maleic anhydride and a diamine compound, an example of which is "ATU-BMI Resin" by Ajinomoto Co., Inc. As such diamine compounds there may be mentioned preferably aromatic diamine compounds such as diaminobenzene, 4,4'-diamino-3,3'-dimethylbiphenyl, 4,4'-diaminodiphenyl ether, 4,4'-diaminodiphenylmethane and 2,2-bis(4-aminophenyl)propane.

As thermosetting resins there may also be mentioned (iso)cyanate compound-based resins. Specifically there may be mentioned, for example, cyanate compounds, including bisphenol A dicyanate, bis(4-cyanatephenyl)ether and 1,1,1-tris(4-cyanatephenyl)ethane, and especially "XU-71787-02" by The Dow Chemical Company.

Isocyanates may also be mentioned, with no limitations so long as two or more isocyanate groups are present per molecule. Such polyvalent isocyanates include, for example, aliphatic, alicyclic and aromatic diisocyanates, among which there may be mentioned as examples, 1,4-tetramethylene diisocyanate, 1,5-pentamethylene diisocyanate, 1,6-hexamethylene diisocyanate, 2,2,4-trimethyl-1,6-hexamethylene diisocyanate, lysine diisocyanate, 3-isocyanatemethyl-3,5,5-trimethylcyclohexyl isocyanate (isophorone diisocyanate), 1,3-bis(isocyanatemethyl)-cyclohexane, 4,4'-dicyclohexylmethane diisocyanate, tolylene diisocyanate, 4,4'-diphenylmethane diisocyanate, 1,5-naphthalene diisocyanate, toluidine diisocyanate and xylylene diisocyanate.

The aforementioned polyvalent isocyanates may also be derived from aliphatic, alicyclic or aromatic polyvalent isocyanates, and they may be, for example, isocyanurate-modified polyvalent isocyanates or urethane-modified polyvalent isocyanates. Suitable polyvalent isocyanates to be used for the invention also include block polyvalent isocyanates, wherein the isocyanate groups of the polyvalent isocyanates are blocked with a blocking agent.

Examples of such blocking agents include alcoholic, phenolic, active methylene-based, mercaptan-based, acid amide-based, acid imide-based, imidazole-based, urea-based, oxime-based, amine-based, imide-based and pyridine-based compounds, which may be used alone or in admixture.

As one manner of use of the solution for formation of a cured film, a resin solution comprising, as resin components, 1–100 parts by weight (especially 5–50 parts by weight) of a thermosetting resin, for example, at lest one type of thermosetting resin selected from the group consisting of epoxy resins, bismaleimide-triazine based resins, bismaleimide resins and (iso)cyanate compound-based resins (especially an epoxy resin), and a curing agent (thermosetting resin-hardening agent) (preferably 0.1–100 parts by weight and especially 0.1–20 parts by weight), is most preferably coated and dried to hardness on a polyimide film to obtain a cured film, in order to achieve satisfactory cohesion and heat resistance, as well as atomic oxygen resistance and workability.

A thermosetting resin-hardening agent or, optionally, a thermosetting resin-hardening accelerator, for thermosetting resins (especially epoxy resins) may be used in the resin solution to produce the cured film. As specific examples of thermosetting resin-hardening agents there may be mentioned phenols such as phenolnovolac, o-cresolnovolac and phenolcresole, amines such as 2-ethyl-4-methylimidazole and diethylenetriamine, acid anhydrides such as phthalic anhydride, and the like.

The polyimidesiloxane preferably also contains a small amount of an inorganic ultraviolet absorber (such as titanium oxide, for example) or a polymeric ultraviolet absorber (usually with a molecular weight of about 1000 or greater), preferably in an amount of about 0.01–10 parts by weight per 100 parts by weight of the polyimidesiloxane.

The organic polar solvent used to prepare the resin solution for the cured film may be the same organic polar solvent used for production of the polyimidesiloxane, and preferred examples thereof include diglyme-based solvents such as diethyleneglycol dimethylether (diglyme), triethyleneglycol dimethylether (dimethyltriglyme), tetraglyme, and the like.

The atomic oxygen-resistant film of the invention may be suitably obtained by coating the surface of an aromatic polyimide film with a cured film-forming solution composition comprising all of the aforementioned resin components uniformly dissolved in the organic polar solvent, and drying the coated layer at a temperature of 120–200° C. for about 20 seconds to 10 minutes, to form a thin cured film with a thickness of 0.1–10 µm, preferably about 1–10 µm, especially about 1–6 µm, after removal of the solvent.

According to the invention, the mass reduction rate of the film is no greater than 1.0% and preferably no greater than 0.2% when irradiated with atomic oxygen at an irradiation dose of approximately $3 \times 10^{20}$ atoms/cm$^2$ at a speed of about 8 km/sec (with the film material at room temperature). Thus, the film has excellent atomic oxygen-resistant property.

The invention will now be further illustrated by way of examples. In the examples, the inherent viscosity (η) is the value calculated by the equation provided below, upon preparing a uniform resin solution of the polyimidesiloxane in triglyme to a resin component concentration of 0.5 g/100 milliliters of solvent, and measuring the solution viscosity of the solution and the solution viscosity of the solvent alone at 30° C.

REFERENCE EXAMPLE 1

A prescribed amount of triglyme as the solvent was added to a reactor, and then 70 moles of ω,ω'-bis(3-aminopropyl)polydimethylsiloxane (X-22-161AS, n:9, product of Shinetsu Silicone Co., Ltd.), 15 moles of 3,5-diaminobenzoic acid and 15 moles of 2,2-bis[4-(4-aminophenoxy)phenyl]propane were added with respect to 100 moles of 2,3,3',4'-biphenyltetracarboxylic dianhydride (a-PBDA), the mixture was stirred at 50° C. for 2 hours under a nitrogen stream to produce a polyamic acid, and the reaction solution was heated to about 200° C. and stirred at that temperature for 3 hours to produce a polyimidesiloxane.

The obtained polyimidesiloxane solution had a solid concentration of 42 wt % and a polyimidesiloxane inherent viscosity ηinh of 0.2 (number average molecular weight: 20,000).

EXAMPLE 1

To a reactor there were added 1200 parts by weight of the aforementioned polyimidesiloxane solution (solid portion: 500 parts by weight), 100 parts by weight of an o-cresol novolac epoxy resin (EPIKOTE 180S65, product of Japan Epoxy Resin Co., Ltd.) as a compatible epoxy resin, 10 parts by weight of 2-ethyl-4-methylimidazole (CUREZOL 2E4MZ, product of Shikoku Chemicals Corp.) as a thermosetting resin-hardening agent, and triglyme, and a uniform solution was obtained.

This coating solution had a solid concentration of 23 wt % and a viscosity of 100 cps, with no inorganic additives.

The coating solution was coated onto one side of a 50 µm-thick untreated 3,3',4,4'-biphenyltetracarboxylic dianhydride-based polyimide film (UPILEX-R, product of Ube Industries, Ltd.) using a microgravure coater and subjected to heat drying with a drying apparatus at 160° C. for 4 minutes to form a transparent cured film with a thickness of 3 µm.

The properties of the obtained atomic oxygen-resistant film were evaluated by the following methods.

An atomic oxygen (AO) irradiation apparatus (NASDA-PSPC-18219) was used for an atomic oxygen irradiation test on the cured film surface, under the following conditions:

Laser apparatus: LT-612 (Lumonics)
Laser wavelength: CO$_2$ laser (10.6 µm)
Laser output: maximum 12J The irradiation was carried out as follows.

Irradiation time: 35.5 hours, average oxygen dose: 52.7 sccm/6 Hz (corresponding to an irradiation dose of about $3 \times 10^{20}$ atoms/cm$^2$)

AO speed: 8.11 km/s
Irradiation area: 3.14 cm$^2$
Sample temperature: room temperature
The results were as follows.
Mass change before and after irradiation of atomic oxygen-resistant film
Before irradiation: 34.440 mg
After irradiation: 34.454 mg
Difference: 0.014 mg

COMPARATIVE EXAMPLE 1

An untreated polyimide film (KAPTON 100H, 25 µm thickness, product of DuPont) was subjected to an atomic oxygen irradiation test.

The results were as follows.
Mass change before and after irradiation of atomic oxygen-resistant film (averages for 3 measurements)
Before irradiation: 18.279 mg
After irradiation: 13.707 mg
Difference: −5.572 mg

EXAMPLE 2

An atomic oxygen-resistant film having a transparent cured film formed to a thickness of 3 µm was obtained in the same manner as Example 1, except that the polyimide film used was the 50 µm-thick untreated 3,3',4,4'-biphenyltetracarboxylic dianhydride-based polyimide film UPILEX-S (product of Ube Industries, Ltd.).

The results were as follows.
Mass change before and after irradiation of atomic oxygen-resistant film (average of 2 measurements)
Before irradiation: 36.607 mg
After irradiation: 36.538 mg
Difference: −0.069 mg The atomic oxygen-resistant film of the present invention provides satisfactory atomic oxygen resistance by a simple treatment.

What we claim is:

1. An atomic oxygen-resistant film comprising a thermal control space material comprising an atomic oxygen-resistant coated film formed on a polyimide film, wherein the polyimide film has a thickness of 7.5 to 50 µm and the atomic oxygen-resistant coated film has a thickness of 0.1 to 6 µm, and wherein the atomic oxygen-resistant coated film is a transparent cured film obtained by coating an organic solution of a polyimidesiloxane, a thermosetting resin and a thermosetting resin-hardening agent onto the polyimide film and heating to dryness to form a cured film, having a mass reduction rate of no greater than 1.0% when irradiated with atomic oxygen at an irradiation dose of approximately $3 \times 10^{20}$ atoms/cm$^2$ at a speed of about 8 km/sec.

2. An atomic oxygen-resistant film according to claim 1, wherein the polyimidesiloxane is an organic polar solvent-soluble polyimidesiloxane obtained from a tetracarboxylic acid component and a diamine component comprising 10–90 mole percent of a diaminopolysiloxane represented by general formula (1):

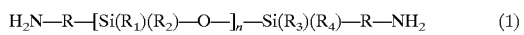

$$H_2N—R—[Si(R_1)(R_2)—O—]_n—Si(R_3)(R_4)—R—NH_2 \quad (1)$$

(wherein R represents a plurality of methylene groups of 2–6 carbons or a divalent hydrocarbon residue comprising a phenylene group; $R_1$, $R_2$, $R_3$ and $R_4$ each represent an alkyl group of 1–5 carbons or a phenyl group; and n represents an integer of 3–60) and 10–90 mole percent of an aromatic diamine (where the diaminopolysiloxane and aromatic diamine total 10 mole percent).

3. An atomic oxygen-resistant film according to claim 1, wherein the polyimidesiloxane is obtained from a tetracarboxylic acid component and a diamine component comprising 10–90 mole percent of a diaminopolysiloxane, 1–20 mole percent of an aromatic diamine having a COOH or OH group which is reactive with an epoxy or isocyanate group, and 5–70 mole percent of a polycyclic aromatic diamine.

4. An atomic oxygen-resistant film according to claim 1, wherein the thermosetting resin is at least one thermosetting resin selected from the group consisting of epoxy resins, bismaleimide-triazine resins, bismaleimide resins and (iso)cyanate compound-based resins.

5. An atomic oxygen-resistant film according to claim 1, wherein the proportion of each of the components is 1–100 parts by weight of the thermosetting resin per 100 parts by weight of the polyimidesiloxane.

6. An atomic oxygen-resistant film according to claim 1, which further comprises an inorganic or polymeric ultraviolet absorber.

7. An atomic oxygen-resistant film according to claim 1, wherein the thermosetting resin is compatible with the polyimidesiloxane.

8. An atomic oxygen-resistant film according to claim 1, wherein the thickness of the atomic oxygen-resistant coated film is 0.1 to 3 $\mu$m.

9. A process for preparing an atomic oxygen-resistant film comprising:

applying a coating solution comprising 100 parts by weight of a polyimidesiloxane, 1 to 100 parts by weight of a thermosetting resin and 0.1 to 100 parts by weight of a thermosetting resin-hardening agent dissolved in an organic solvent onto a surface of a polyimide film with a thickness of 7.5 to 50 $\mu$m; and drying the coated solution at 120 to 200° C. for 20 seconds to 10 minutes to form a transparent cured film with a thickness of 0.1 to 6 $\mu$m.

* * * * *